Patented Oct. 14, 1924.

1,511,560

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING A DOUBLE SALT OF SODIUM FLUORID AND SODIUM SULPHATE.

No Drawing.   Application filed June 30, 1922.   Serial No. 572,035.

*To all whom it may concern:*

Be it known that I, HENRY HOWARD, a citizen of the United States, residing at Cleveland, in the county of Cuyahoga and State of Ohio, have invented certain new and useful Improvements in Processes of Making a Double Salt of Sodium Fluorid and Sodium Sulphate, of which the following is a specification.

This invention relates to an improved process of converting sodium sulphate or sodium acid sulphate to sodium fluorid, the process resulting in the production of the double salt $2NaF, Na_2SO_4$ together with ammonium sulphate and artificial cryolite as by-products.

A feature of the invention is the production of the double salt $2NaF, Na_2SO_4$, this salt being a valuable toxic agent for wood preservation and for the destruction of insects such as roaches, by a simple and economical process involving the use of cheap raw-materials, simple operations, inexpensive apparatus, and the production of valuable by-products.

The raw materials entering into the process are hydrofluoric acid, ammonia and sodium sulphate or sodium acid sulphate. The hydrofluoric acid preferably is used in gaseous form generated as it is required and immediately used thus avoiding loss of the acid by storage and the danger involved in storing, shipping and handling it. The supply of ammonia preferably is obtained from cheap ammoniacal solutions such as gas liquors of the grade of powder makers' ammonia, the liquor being used directly in the process without purification. As a source of sodium sulphate, salt cake or niter cake is used both being inexpensive materials. The process affords a convenient disposition for niter cake.

Further features of the invention are the employment of a minimum number of operations with correspondingly small operation losses and the use of only slightly acid reaction mixtures throughout the process whereby losses of ammonia and hydrofluoric acid by volatilization are minimized and the use of expensive acid proof apparatus is avoided.

The process is carried out as follows:

Sodium sulphate, preferably in the form of salt cake, or sodium acid sulphate, preferably in the form of niter cake, is dissolved in water. When niter cake is used it is gradually stirred into water with the simultaneous introduction of ammonia preferably in the form of gas liquor, the solution being kept slightly acid until the desired quantity of niter cake has been added and dissolved. Sufficient ammonia is then added to render the solution substantially neutral. The heat of the reaction between the acid of the niter cake and the ammonia assists the quick solution of the niter cake. The batch is kept slightly acid during the addition of niter cake and ammonia to avoid loss of ammonia. When salt cake is used the addition of ammonia at this stage of the process is omitted.

To the solution of sodium sulphate or sodium sulphate and ammonium sulphate thus prepared hydrofluoric acid, preferably in the form of gas, and ammonia, preferably in the form of gas liquor, are added simultaneously at a relative rate sufficient to maintain the reaction mixture slightly acid. The hydrofluoric acid gas preferably is supplied to the reaction mixture directly from a generator without intermediate storage. The reaction mixture is finally brought to neutral condition by the addition of ammonia. In this operation the ammonia and hydrofluoric acid are supplied to the solution of sodium sulphate in the amounts required to complete the reaction indicated in the following equation—

(1) 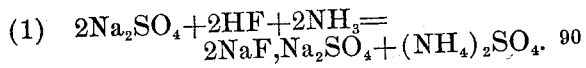

When niter cake is used as the source of sodium sulphate the reaction is as follows:

(2) 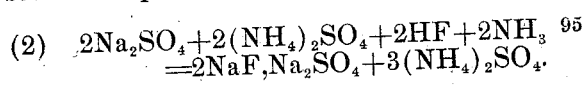

The reagents are combined at about room temperature say 60° F. but the reaction mixture heats up considerably due to the heat of reaction. When the reaction is complete the mixture is cooled to about 60° F. or lower and the precipitate of the double salt, $2NaF, Na_2SO_4$, is separated by decantation, filtration or other suitable means, washed free from adhering mother liquor and dried.

The reaction should be carried out in a solution which at the end of the reaction is at the maximum concentration which will hold the ammonium sulphate in solution at the temperature employed. This condition is readily obtained in practice by regulating the amount of water used to dissolve the sodium sulphate or acid sulphate and if necessary by adding water to the reaction mixture during the process or after the reaction is complete. The amount of water to be used will depend upon the form of ammonia used, that is, ammonia gas or ammoniacal liquor, and in the latter case, upon the concentration of the liquor. By maintaining the maximum concentration of the reaction mixture which will hold the ammonium sulphate in solution, the recovery of both the double salt and the ammonium sulphate is facilitated. The double salt is relatively insoluble and if the reaction mixture is maintained at substantially maximum concentration as indicated a very clean separation of the double salt from the mother liquor is obtained.

The mother liquor contains ammonium sulphate and a small amount, say from 3 to 6 per cent, of sodium fluorid. The sodium fluorid is removed from the mother liquor in the form of artificial cryolite by adding to the liquor the necessary quantity of aluminum fluorid. The artificial cryolite precipitate is separated and washed and forms a valuable by-product of the process.

The ammonium sulphate is then recovered from the purified mother liquor in the well known manner.

If, in the process, it is attempted to form sodium fluorid as a principal product of the process by mixing the sodium sulphate solution with hydrofluoric acid and ammonia in the proportions represented by the equation,

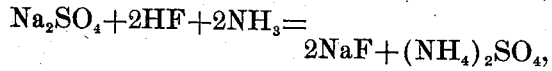

it is found that the reaction does not proceed as indicated by this equation but the double salt is formed in considerable proportions according to the equation,

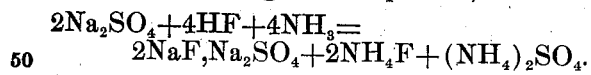

I claim:

1. Process of making a double salt of sodium fluorid and sodium sulphate which comprises combining about one molecular proportion of sodium sulphate with about one molecular proportion of hydrofluoric acid and about one molecular proportion of ammonia in aqueous solution.

2. Process of making a double salt of sodium fluorid and sodium sulphate which comprises, simultaneously adding hydrofluoric acid gas and ammonia to a solution containing sodium sulphate.

3. Process of making a double salt of sodium fluorid and sodium sulphate as defined in claim 2 in which the reaction mixture is maintained slightly acid during the addition of hydrofluoric acid.

4. Process of making a double salt of sodium fluorid and sodium sulphate which comprises, simultaneously adding one molecular equivalent of hydrofluoric acid in the form of a gas and one molecular equivalent of ammonia in the form of gas liquor to a solution containing one molecular equivalent of sodium sulphate.

5. Process of making a double salt of sodium fluorid and sodium sulphate which comprises, treating sodium acid sulphate with ammonia in quantity sufficient to neutralize the free acid of the sodium acid sulphate, and treating the reaction product with hydrofluoric acid and ammonia simultaneously.

6. Process of making a double salt of sodium fluorid and sodium sulphate which comprises, feeding niter cake into a body of water and simultaneously adding ammoniacal gas liquor to the body of water at a rate sufficient to maintain the solution slightly acid until the niter cake is dissolved, neutralizing the solution, feeding hydrofluoric acid gas and ammoniacal gas liquor into the solution simultaneously at a relative rate sufficient to maintain the reaction mixture slightly acid until hydrofluoric acid chemically equivalent to the sodium sulphate has been added, neutralizing the reaction mixture with ammoniacal gas liquor, and recovering the double salt of sodium fluorid and sodium sulphate from the reaction mixture.

7. Process of making substantially pure ammonium sulphate from sodium acid sulphate and ammonia, which comprises treating sodium acid sulphate with ammonia in quantity sufficient to neutralize the free acid of the sodium acid sulphate, and treating the reaction product with hydrofluoric acid and ammonia.

In testimony whereof, I affix my signature.

HENRY HOWARD.